United States Patent [19]
Watson

[11] 3,871,148
[45] Mar. 18, 1975

[54] GRAIN HOPPER STRUCTURE
[76] Inventor: Robert George Watson, 95 Glengowan Rd., Toronto, Ontario, Canada
[22] Filed: Jan. 30, 1974
[21] Appl. No.: 437,856

[52] U.S. Cl.................. 52/197, 52/237, 52/245, 214/16 R
[51] Int. Cl................................. E04h 7/22
[58] Field of Search ............. 52/197, 192, 237, 245, 52/236; 214/16 R

[56] References Cited
UNITED STATES PATENTS

| | | | |
|---|---|---|---|
| 2,563,470 | 8/1951 | Kane | 52/197 X |
| 3,124,906 | 3/1964 | Fegles | 52/237 X |
| 3,207,330 | 9/1965 | Charyn et al. | 52/237 X |
| 3,463,332 | 8/1969 | Quadrel et al. | 52/197 X |
| 3,486,282 | 12/1969 | Moriarity | 52/197 X |

*Primary Examiner*—Price C. Faw, Jr.

[57] ABSTRACT

This specification discloses an improved hopper structure for use in the storage of grain the similar granular material. The hopper structures are mounted on the vertical walls of the silo structure in substantially zero hoop-tension relationship.

This structure eliminates the clumsy supporting structure normally associated with grain hoppers and permits building the silos to a much greater height.

7 Claims, 6 Drawing Figures

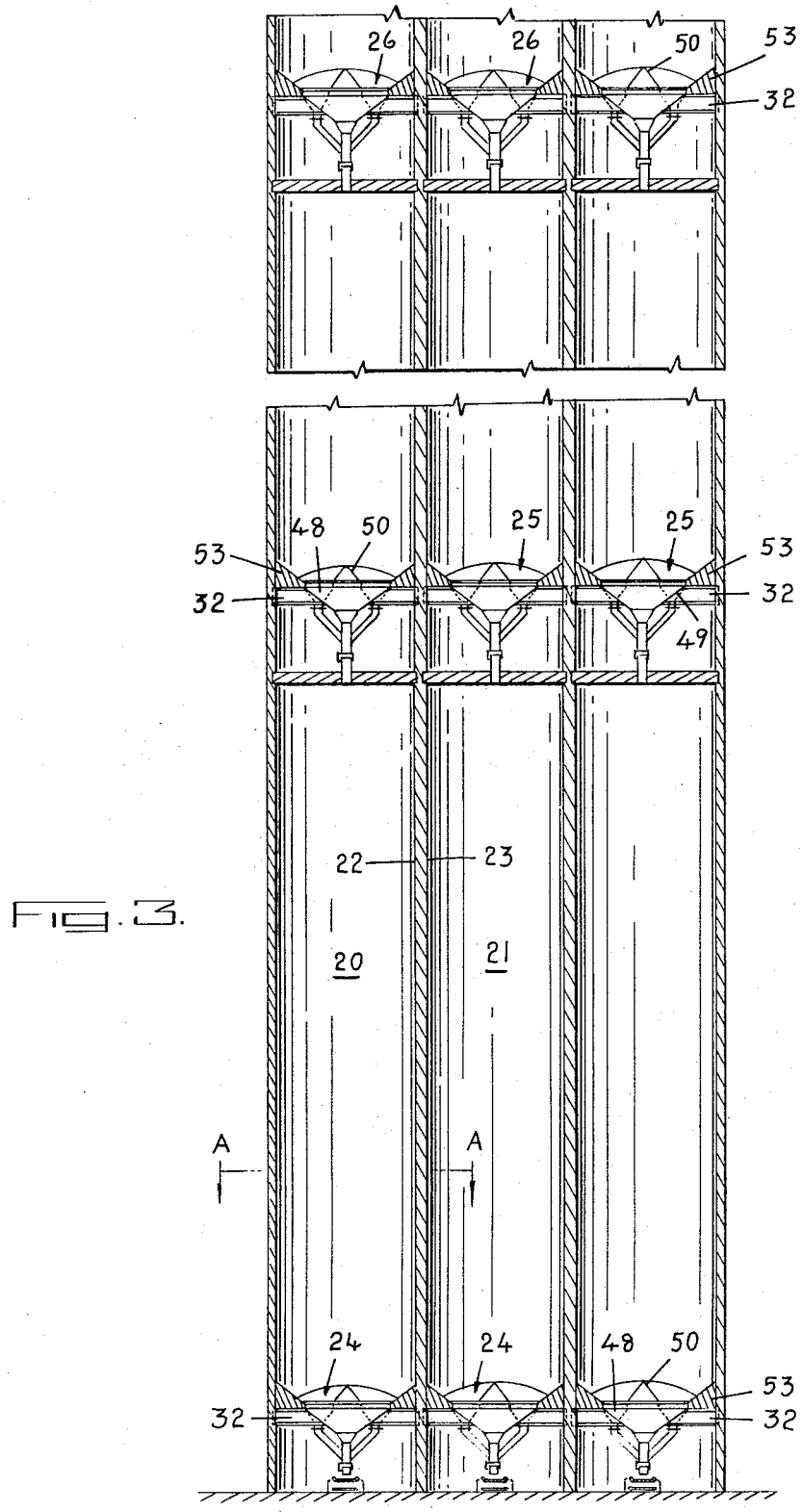

GRAIN HOPPER STRUCTURE

This invention relates to structures for storing particulate or particulate form materials such as grain, sand, gravel or the like and more particularly to hoppers for use in such structures.

In this specification reference will be made to grain and the problems associated with its storage and withdrawal from storage, but it will be understood that the structures described may be used with equal facility for the storage of gravel or similar materials. Such other uses may require adaptation but such modifications will not be outside normal engineering considerations arising from weight and strength.

BACKGROUND OF THE INVENTION

The present and usual mode of storing grain requires the provision of elevators or silos at selected convenient sites for storage, and/or transportation and at which any work requiring to be done may be effected. These sites are usually railway terminals or shipping terminals. Transportation technology and consequently transportation patterns have changed. Elevators which were formerly capable of providing adequate handling and storage facilities are inadequate. The existing situation of elevators, particularly at ports, has been limited by surrounding land development. These problems have arisen because of the conventional structures of elevators and in particular the structure of the silos. Other problems have arisen from other aspects of the elevator structure and their solution constitutes the subject matter of my co-pending application, Ser. No. 437,855 filed concurrently herewith on Jan. 30, 1974.

The present conventional structure of an elevator silo comprises a pair of series of parallel, vertical cylinders with the cylinders defining storage bins and the interstitial spaces defining auxiliary or star bins. These storage bins are provided with a single hopper at the bottom end to withdraw and control the withdrawal of grain.

These structures are difficult and expensive to build, and they are limited in height and utility.

Normally, the height is limited to approximately 100 feet because the vertical loads and the hoop tensional stresses exerted on the present structures do not permit greater heights.

In present structures, only one hopper as mentioned previously, is provided at or adjacent to the base. This limits the utility and structure and arises because of the hopper structure itself, and the means for supporting the hopper.

At the present time only one hopper is provided in elevator silos. These hoppers usually comprise either a downwardly depending cone of steel or concrete which takes substantially the entire load and is supported by a spaced apart series of vertical pillars.

It will be evident that the foregoing structure does not lend itself, neither economically nor practically, to provision at any distance above the ground.

The falsework and the supporting pillars preclude the provision of more than one hopper adjacent the base and even that one hopper which is provided is expensive and clumsy to build for the same reasons.

These considerations are principally structural. There are also functional deficiencies. When material is drawn off hollow cylindrical storage structures through a basal hopper as is the common practice, "funnelling" occurs. That is, there is a tendency for the material from the middle to be drawn off and there is a funnel developed throughout the height of the material. As a result, the material is drawn off from different heights rather than from the bottom. This gives rise to an inconsistency of quality. The material is normally deposited in horizontal layers which may not be homogeneous if the loads from which they were formed come from different sources.

There is also the problem of ensuring that older material is withdrawn first. With the funnelling effect, the older grain tends to remain adjacent the bottom periphery and there is consequently a loss of value.

SUMMARY OF THE INVENTION

In view of foregoing difficulties, it is the principal object of the present invention to provide improved elevator structures for storage of granular material and the like, and hopper structures which are more economical to build and operate.

It is a further object of the present invention to provide elevator structures for storage of granular materials, which will accommodate and store more material on a given area of land than heretofore.

To accomplish these objects and the various other objects which will become more apparent, there is provided in accordance with the present invention, a rigid bin structure comprising a substantially continuous load-bearing wall extending upward to define a hollow cylinder; and at least one hopper structure mounted across said cylinder adjacent the bottom thereof in substantially zero hoop-tension relationship with said load-bearing wall.

The objects and the various features of the invention will be more apparent from the following descriptions and drawings in which a specific embodiment is described by way of example and in which:

FIG. 3 is a schematic vertical section through silos constructed in accordance with the present invention;

FIG. 4 is an enlarged plan view taken along A—A in FIG. 3;

Figure 1:
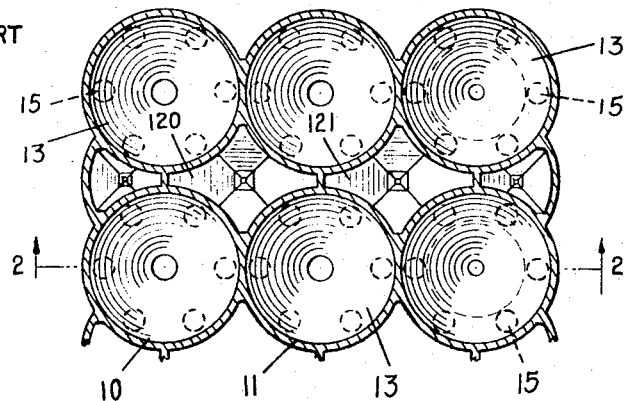
FIG. 1 is a schematic plan view of prior art showing a granular storage structure which constitutes the usual mode of construction.
Figure 2:
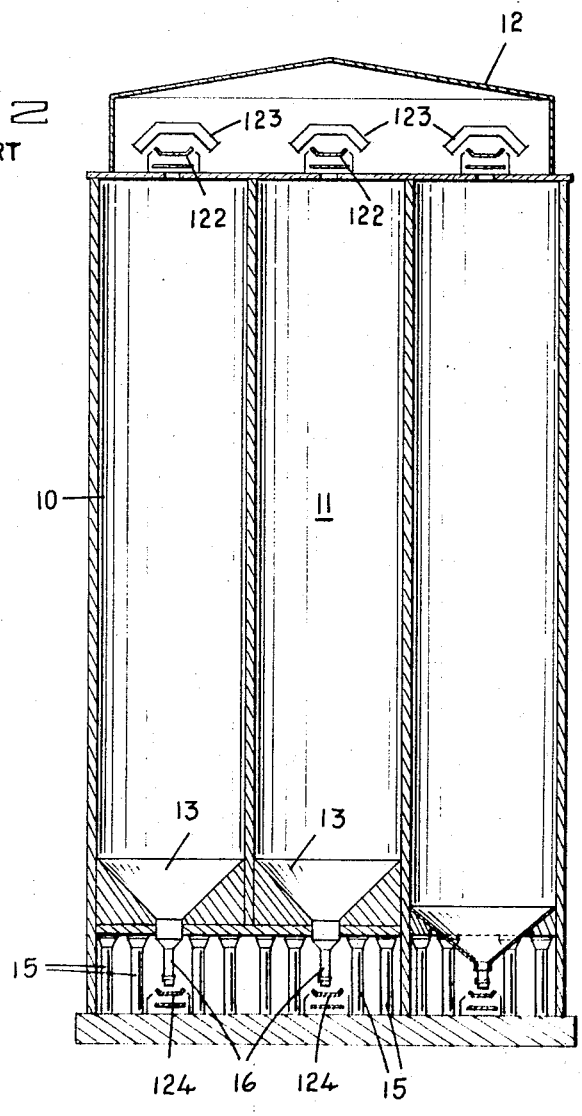
FIG. 2 is a shematic view in elevation, of prior art showing a conventional grain storage structure such as may be seen along line 2—2 of FIG. 1.
Figure 9:
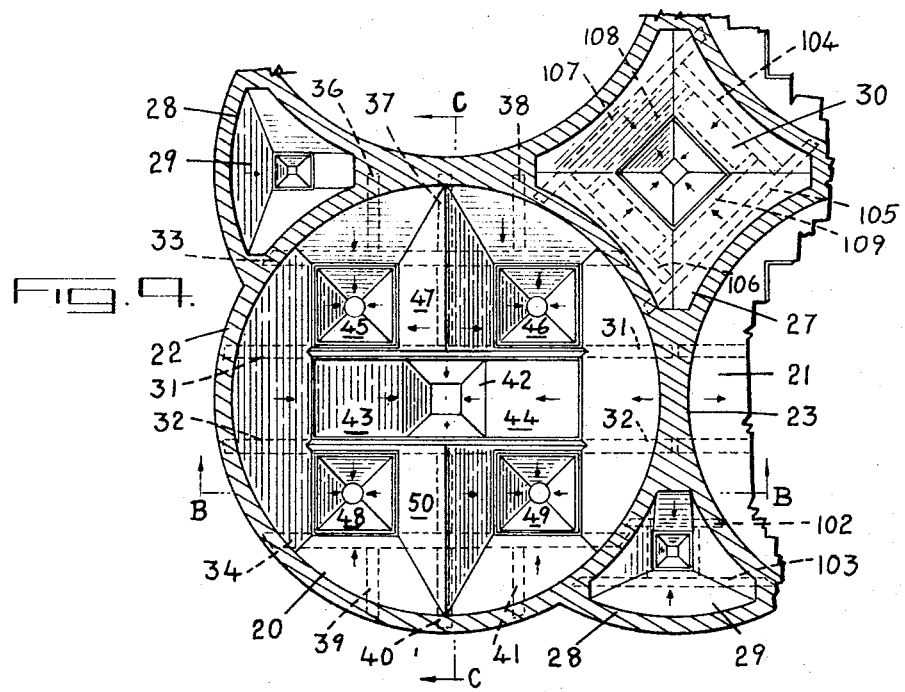
Figure 5:
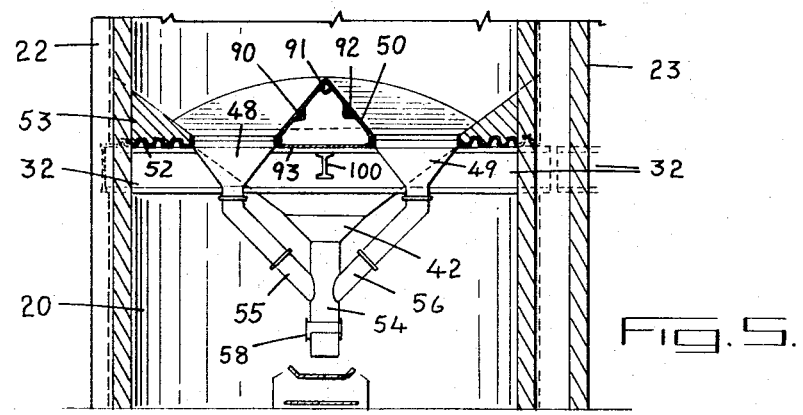
FIG. 5 is a section taken along B—B of FIG. 4.
Figure 6:
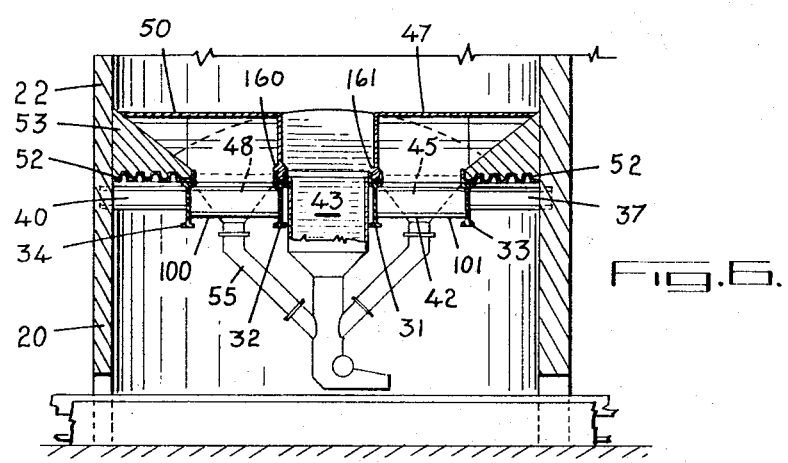
FIG. 6 is a section taken along line C—C of FIG. 4.

Referring now to the drawings, in FIGS. 1 and 2 are shown structures built in accordance with the prior art.

As illustrated, they generally comprise a plurality of parallel series of silos such as 10 and 11 of cylindrical form with the main cylinders defining bins and the interstices providing auxiliary storage or "star bins" 120 and 121 respectively. A cupola 12 is usually provided as in the drawings, at the top of the bins. These cupolas serve to protect the conveyors such as 122 and their associated trippers 123 from the weather.

Adjacent the bottom of each silo there is provided a concrete hopper 13. These hoppers of the prior art are generally formed as shown. And comprise downwardly tapering walls which are supported by a series of pillars 15, arranged as shown.

Discharge ducts or conduits such as 16 are mounted on the openings of hoppers 13 to control the flow therefrom to conveyors such as 124.

In FIGS. 3 through 6, the silo structures made in accordance with the present invention are illustrated. As shown, these comprise, as does the prior art, a plurality of series of cylindrical silos such as 20 and 21 with adjacent common walls or counterplanes such as 22 and 23.

However, these structures may be built considerably higher than the conventional 100 to 146 feet which is possible with the present structures, but should be limited to diameters in the range 10 to 30 feet.

In loaded structures of the prior art, the hopper carried the main vertical load component and the vertical walls were subjected to radial and/or circumferential tension, which may collectively be called hoop-tension, together with a vertical component. Consequently, the economics of providing higher structures made them substantially impossible to build. The wall thicknesses required by the prior art to provide structures of the height now possible with the present invention, are impractical. With the present invention increased wall thickness is required, but the increased thickness is only to the extent that the walls are required to carry additional vertical loads.

As shown in FIG. 3 in accordance with the present invention, each silo is provided with a plurality of vertically spaced apart hopper structures such as 24, adjacent the base, and 25 and 26 at the 100 and 200 feet levels, respectively. Each of these hopper structures may be fed into an adjacent lower bin or to weighing or cleaning stations by conveyors as may be considered necessary.

In the illustrated structure the interior interstices between silos, as with the prior art, provide star bins such as 27 and the exterior interstices provide outer bins such as 28. These auxiliary or additional bins are, as shown in FIG. 4, provided with corresponding hopper structures 29 and 30, at each hopper level.

The fragmentary plan view of FIG. 4 illustrates the individual structures of these hoppers and this is characteristic of the structure at each level.

Between counterplanes 22 and 23, two beams 31 and 32 extend in parallel and equidistant from the diameter. Outward of each of these beams further beams 33 and 34 extend in parallel in the manner shown. Beams 33 and 34 are in turn provided with support by beams 36, 37 and 38, and 39, 40 and 41, respectively. Each beam is seated on a bearing plate.

A central hopper 42 with downwardly extending wing plates 43 and 44 is connected to, and supported between beams 31 and 32. Beams 32 and 34 support a pair of smaller spaced apart hoppers 48 and 49, and a baffle, 50, between and supported on plate 93 and beam 100 guides materials toward the respective hoppers. It will be evident that the provision of angles 90, 91, and 92 provides additional strength to baffle 50. Beams 31 and 33 similarly support hoppers 45 and 46 and baffle 47. Baffle 47 has the same construction as baffle 50 and as indicated at 51, is supported by beam 101.

About the inner wall of the silo, a steel deck 52 is mounted and a concrete beam 53 is poured. This beam is provided with inclined upper surfaces to guide the material into the hoppers as illustrated, and the inclines on the various surfaces are indicated by the directions of the arrows.

On the lower open end of each hopper a discharge conduit is provided. From hopper 42 a main discharge conduit 54 extends downward and from each of the side hoppers auxiliary conduits 55, 56 and 57 extend and join the main discharge conduit 54. At the lower end of conduit 54 a suitable valve 58 is provided to control the flow.

The outer space bin 28 and the star bin 27 are also provided with hoppers such as 29 and 30 respectively, and they are also supported by horizontal beams shown in dotted outline at 102 and 103; and 104, 105, 106, 107, 108 and 109, respectively.

It will be evident that the structure which has been described is capable of being built by conventional slip-form methods. However, it also provides considerable economy in that the hopper structure may be prefabricated and the erection on site is more simple than that of prior structures. There is no necessity for the provision of any falsework or auxiliary supporting structure.

As the form proceeds vertically and reaches the hopper level, openings are provided in the silo wall to receive the wall-bearing beams 31, through 34 inclusive. These beams are then mounted in position and suitably secured together. Depending on the relative configuration and size of the central hopper 42, and the auxiliary hoppers 45 through 49, these may be raised above the beams prior to their mounting or between them after mounting. If raised prior to the mounting of the beams, the hoppers and their associated baffles are then simply lowered into position and secured by welding, rivetting or any other suitable means.

The steel deck is then laid in position and secured, and the peripheral beam 53 and any intermediate concrete baffles such as 160 and 161 poured. The conduits 55 through 57 are then secured in position. The procedure erecting for the star bin and outer space bin hoppers is the same.

The facility which the hopper structure provides in assembly constitutes a great advantage over the prior art. Each component can be prefabricated. And the size of each component permits it to be raised into any position at any height. The necessity of clumsy, expensive falsework is eliminated so that these hoppers of the present invention may be provided at any selected level as they are in the described structures.

It will of course be understood that the individual hoppers and their associated ducts or conduits, sometimes referred to collectively herein as the hopper structure, are preferably made of steel or any equivalent material.

It will also be evident that the concrete components may have equivalent steel structures substituted depending on costs and facility.

The structure which has just been described exemplifies the hopper structure which may be employed at all hopper levels.

Structurally, it is believed that the provision of the transverse beams, the peripheral beam, and the hopper structure substantially eliminates hoop-tensional forces on the vertical wall of the silo through the plane where the beams enter the wall. As is evident from the prior art, in particular U.S. Pat. No. 3,124,906, former silo hopper structures carried substantially the entire vertical load.

The baffles, the hopper, the transverse beams and the peripheral beam of the structure of the present invention carry the vertical load in a loaded hopper at each level transferring in into the wall where it is resolved into a vertical compressive force in the wall.

In a loaded silo immediately above each hopper, the silo wall will be subjected to maximum hoop-tensional forces decreasing again to zero at the upper level of the material.

However, the hoop-tensional forces in the individual bins are not transferred to adjacent bins.

The strength of the vertical silo walls in the present embodiment will have to increase in relation to the load. However, since the only load which appears to be required to be supported is the additional superior wall, the wall thickness may only be required to be increased by 10–20 percent, relative to normal wall thickness in conventional structures.

The provision of the plurality of hoppers 42 and 45 through 49 inclusive and the associated baffles, leads to a drawing-off of the material adjacent the hoppers and a more uniform "draw-off" across the silo.

This feature ensures homogeneity in the product being withdrawn and a reduction in a tendency to "funnel" as mentioned previously.

While the present invention has been described with particular reference to a specific embodiment, it will be understood that other modifications and variations in the structure may be apparent to those skilled in the art and may be made without departing from the spirit and scope of the invention as defined by the appended claims.

What I claim is:

1. A rigid bin structure for use in storing grain and the like which comprises: a base; a substantially continuous load-bearing wall extending upward from said base to define a hollow cylinder; a first series of spaced apart horizontal beams extending transversely in parallel across said cylinder and secured in opposed portions of said cylinder wall; a second series of spaced apart horizontal beams extending horizontally and normally to said first series of beams and secured to adjacent outer ones thereof; a ring beam extending around the inner periphery of said cylinder to circumferentially secure said first and second beams, hopper means dependingly supported by said beams; and baffle means mounted between said individual hoppers to guide the flow of said grain thereto; said beams, baffle and hopper means being in substantially zero hoop-tension relationship with said wall.

2. A rigid bin structure as claimed in claim 1 wherein, said hopper means comprises: a centrally disposed main hopper and a plurality of outer hoppers equiradially disposed about said main hopper.

3. A rigid bin structure as claimed in claim 2 further including a central outlet duct connected to a lower opening in said main hopper; a plurality of outer outlet ducts each one connected to an individual one of said outer outlet ducts and to said central outlet duct; and control means on said central outlet duct to regulate the flow of material therethrough.

4. A rigid bin structure as claimed in claim 1 wherein, said hopper means each have an inverted substantially truncated pyramidal form.

5. A hopper structure for use in a storage facility for grain and the like having a substantially cylindrical wall which comprises: horizontal beams means extending between and secured in opposed parts of said wall to provide a frame; a main hopper substantially centrally secured in said frame; a plurality of outer hoppers mounted in said frame equiradially of said main hopper; upwardly extending baffle means for providing material guide surfaces between said hoppers; and a ring beam extending about said wall and frame; said beams, baffle and hopper means being in substantially zero hoop-tension relationship with said wall.

6. A hopper structure as claimed in claim 5 wherein, said main hopper and said outer hoppers are adapted in a first attitude to pass between said beams, and in a second attitude to be engageable therewith.

7. A hopper structure as claimed in claim 6, further including a central outlet duct connected to a lower opening in said central hopper; a plurality of outer outlet ducts each one connected to an individual one of said outer outlet ducts and to said central outlet duct; and control means on said central outlet duct to regulate the flow of material therethrough.

* * * * *